(12) United States Patent
Bertoch et al.

(10) Patent No.: US 7,390,052 B2
(45) Date of Patent: Jun. 24, 2008

(54) LIGHT WEIGHT CHASSIS AND HULL

(75) Inventors: Jim Bertoch, Riverside, CA (US); Ken Biddle, Riverside, CA (US); Larry Budica, Riverside, CA (US); Scott Craig, Riverside, CA (US)

(73) Assignee: Fleetwood Enterprises, Inc., Riverside, CA (US)

( * ) Notice: Subject to any disclaimer, the term of this patent is extended or adjusted under 35 U.S.C. 154(b) by 177 days.

(21) Appl. No.: 11/178,875

(22) Filed: Jul. 11, 2005

(65) Prior Publication Data

US 2007/0007794 A1    Jan. 11, 2007

(51) Int. Cl.
*B60P 3/32* (2006.01)
*B62D 27/02* (2006.01)

(52) U.S. Cl. .................. 296/168; 296/156; 296/203.01; 296/209

(58) Field of Classification Search .................. 296/29, 296/164, 168, 178, 181.1, 181.2, 184.1, 185.1, 296/186.5, 191, 156, 209, 203.01, 203.03, 296/204; 52/282.1–282.5, 461
See application file for complete search history.

(56) References Cited

U.S. PATENT DOCUMENTS

| | | | |
|---|---|---|---|
| 2,730,772 A | | 1/1956 | Jones |
| 2,883,233 A | | 4/1959 | Beckley |
| 3,003,810 A | * | 10/1961 | Kloote et al. ............. 296/181.3 |
| 3,356,381 A | | 12/1967 | Rich |
| 3,517,962 A | | 6/1970 | Bassett |
| 3,574,390 A | | 4/1971 | Metsker |
| 3,681,883 A | | 8/1972 | Ehrlich |
| 3,712,005 A | * | 1/1973 | Eschbach et al. ............... 52/210 |
| 3,834,575 A | * | 9/1974 | Carr ........................... 220/1.5 |
| 3,968,989 A | * | 7/1976 | Schippers .................... 296/29 |
| 3,981,107 A | * | 9/1976 | Schubach ....................... 52/11 |
| 4,042,275 A | * | 8/1977 | Glassmeyer et al. .......... 296/43 |
| 4,222,606 A | * | 9/1980 | Brown et al. ............. 296/186.1 |
| 4,385,850 A | * | 5/1983 | Bobath ........................ 403/205 |
| 4,662,138 A | * | 5/1987 | Bryant ....................... 52/282.4 |
| 4,746,164 A | | 5/1988 | Crean |
| 5,042,395 A | * | 8/1991 | Wackerle et al. ............. 105/397 |
| 5,052,741 A | * | 10/1991 | Brown et al. ................. 296/191 |
| 5,143,416 A | * | 9/1992 | Karapetian .................... 296/29 |
| 5,172,519 A | | 12/1992 | Cooper |
| 5,218,792 A | | 6/1993 | Cooper |
| 5,222,287 A | | 6/1993 | Cooper |
| 5,403,063 A | * | 4/1995 | Sjostedt et al. ......... 296/193.07 |
| 5,501,504 A | | 3/1996 | Kunz |
| 5,553,906 A | * | 9/1996 | Kunz ........................... 296/29 |
| 5,588,693 A | * | 12/1996 | Higginson et al. ....... 296/186.1 |
| 5,690,378 A | | 11/1997 | Romesburg |
| 5,738,747 A | | 4/1998 | Blanchard |
| 5,765,906 A | * | 6/1998 | Iwatsuki et al. ......... 296/203.03 |
| 5,769,478 A | * | 6/1998 | Vernese .................... 296/24.31 |
| 5,769,479 A | | 6/1998 | Vernese |

(Continued)

*Primary Examiner*—D. Glenn Dayoan
*Assistant Examiner*—Greg Blankenship

(57) ABSTRACT

A recreational vehicle includes a hull coupled to a chassis where the hull is formed by coupling pre-formed panels together using two piece channel members, and/or the chassis is formed by mechanically coupling pre-formed segments together. In some instances, the two piece channel members will interconnect substantially perpendicular panels such as by coupling wall panels to a floor panel, to a ceiling panel, and to adjacent wall panels. Such a vehicle can be quickly assembled from space efficient pre-formed pieces by lower skilled assemblers than are typically required in manufacturing a recreational vehicle.

13 Claims, 13 Drawing Sheets

U.S. PATENT DOCUMENTS

| | | | |
|---|---|---|---|
| 5,934,741 A * | 8/1999 | Beukers et al. | 296/181.6 |
| 5,997,075 A * | 12/1999 | Dunder et al. | 296/178 |
| 6,092,862 A | 7/2000 | Kuwahara | |
| 6,095,715 A * | 8/2000 | Hulls | 403/403 |
| 6,179,371 B1 | 1/2001 | Miller | |
| 6,183,034 B1 | 2/2001 | Moody et al. | |
| 6,349,988 B1 | 2/2002 | Foster et al. | |
| 6,382,671 B1 | 5/2002 | MacLellan | |
| 6,412,854 B2 * | 7/2002 | Ehrlich | 296/191 |
| 6,729,677 B2 | 5/2004 | Gurdjian et al. | |
| 6,923,493 B2 * | 8/2005 | Buchholz et al. | 296/186.1 |
| 6,974,616 B2 * | 12/2005 | Perez | 428/40.1 |
| 7,114,762 B2 * | 10/2006 | Smidler | 296/186.1 |
| 7,178,860 B2 * | 2/2007 | Lemmons | 296/186.1 |

* cited by examiner

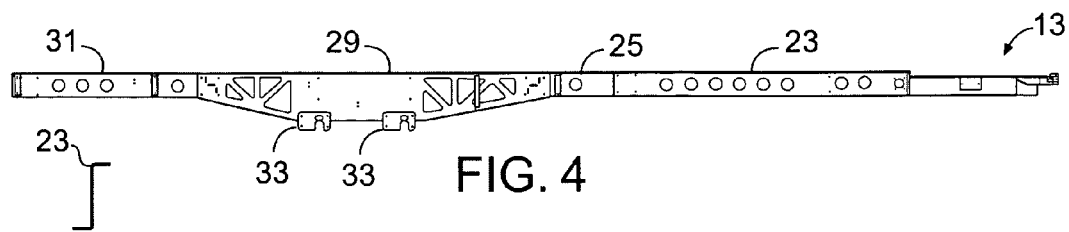
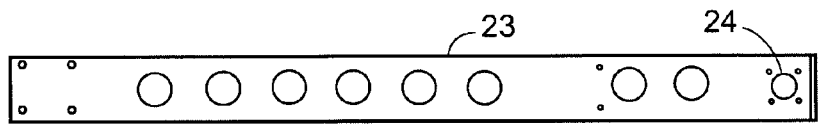
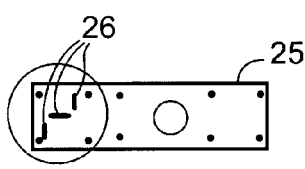
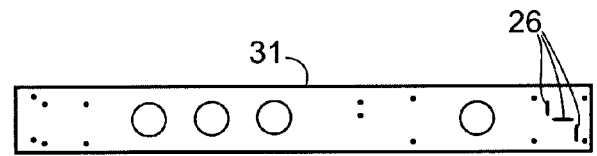
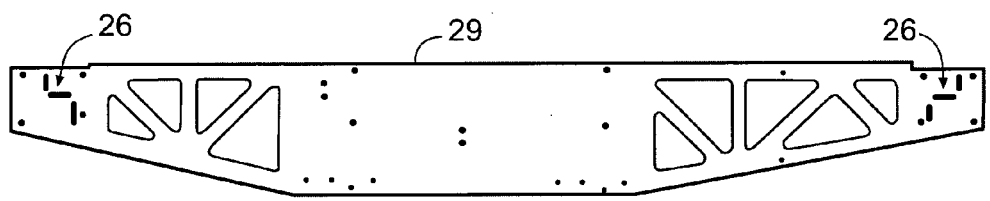
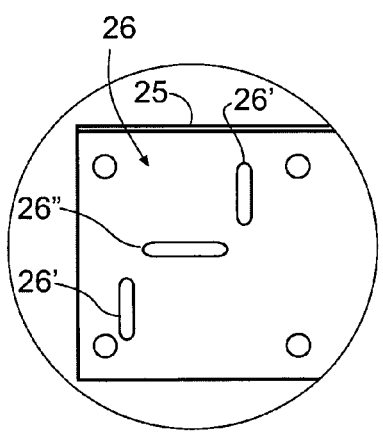
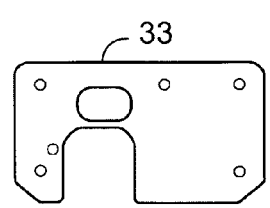
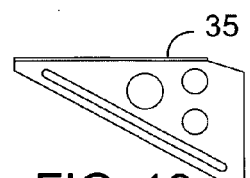
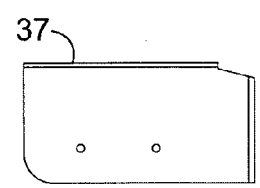
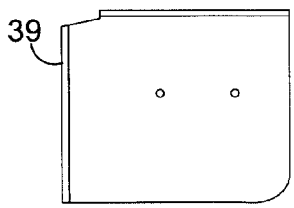

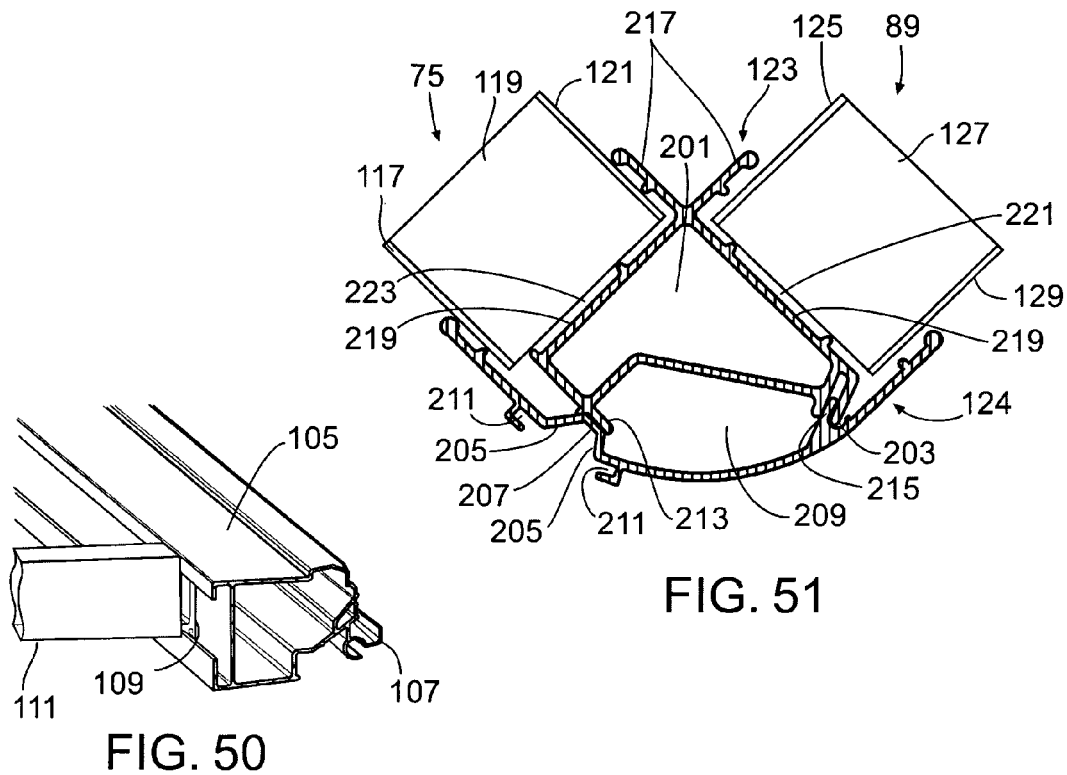
FIG. 51
FIG. 50
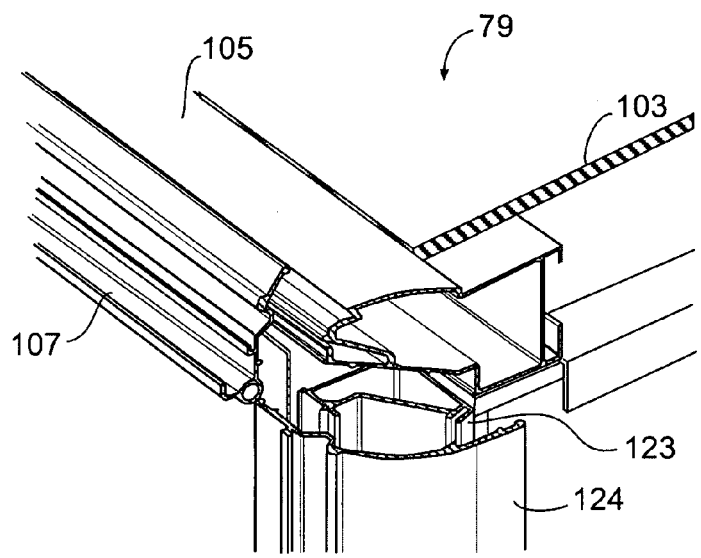
FIG. 52

LIGHT WEIGHT CHASSIS AND HULL

FIELD OF THE INVENTION

The present invention relates generally to recreational vehicles such as trailers and motor homes.

BACKGROUND OF THE INVENTION

Recreational vehicles such as travel trailers and motorhomes have expanded in size and amenities. However, recreational vehicle (RV) construction methods and materials applications have not progressed as far as in other industries. Present day construction of RVs virtually mimics nearly one half century of prior construction techniques and material application.

With increases in size and amenities, RV weights have increased. For towed RVs such as travel trailers, increased RV weight limits the vehicles that can be used to tow the RV. For self-propelled RVs such as motor-homes, increased weight increases the cost of components used to move the RV such as the engine, transmission, and axles. For all types of RVs, increased weight results in increased fuel costs. In order to keep RV weight down, manufacturers generally must compromise in regard to size and amenities.

RV manufacturers typically produce two types of RVs, stick-and-tin, and hardwall. Each of these types has its own distinct material content and assembly methods. While other types/methods have been patented (see U.S. Pat. Nos. 2,883, 233, 5,690,378, and 5,738,747) or perhaps imposed into mainstream production, they are not as commonplace as RV trailers manufactured using stick-and-tin or hardwall assembly techniques.

Trailers assembled with wooden stick-and-tin walls and wooden ceilings are manufactured with sticks glued and stapled together to form the frame. Interior lauan panels are adhered and stapled to form the interior wall. The partially complete wall is secured atop a plywood floor underlayment. Floor underlayment is mechanically fastened atop wooden stud framing and the steel chassis. Fiber glass blanket insulation, similar to insulation used in home construction, is subsequently placed between the vertical wood frame studs. Painted sheet aluminum exterior siding (referenced as "tin") is placed against the wooden framework, interlocked and permanently stapled in position thereby encasing the fiberglass insulation.

Hardwall products are constructed in a similar fashion, but differ in the materials used. Hardwall construction consists of a welded steel or aluminum framework wall and ceiling structure instead of wooden stick framing. Exterior fiberglass with a lauan substrate backer is adhered to expanded polystyrene (EPS) foam insulation panels placed between the steel/aluminum framework, and interior vinyl lauan panels. Completed sidewalls are Tek-screwed (i.e. fastened using self drilling screws) through the wall framework into the side of either a wooden or aluminum stud framed floor.

SUMMARY OF THE INVENTION

A recreational vehicle includes a hull coupled to a chassis where the hull is formed by coupling pre-formed panels together using two piece channel members, and/or the chassis is formed by mechanically coupling pre-formed segments together. In some instances, the two piece channel members will interconnect substantially perpendicular panels such as by coupling wall panels to a floor panel, to a ceiling panel, and to adjacent wall panels. Such a vehicle can be quickly assembled from space efficient pre-formed pieces by lower skilled assemblers than are typically required in manufacturing a recreational vehicle.

In an exemplary embodiment, the recreational vehicle comprises a hull coupled to a mobile chassis. The hull comprises a plurality of panels coupled together by a plurality of channel members. At least one elongated channel member of the plurality of channel members comprises two pieces. A first piece of the two pieces includes one side of a first channel extending along the length of the channel member in which a first panel of the plurality of panels of the hull is bonded. A second piece of the two pieces includes an opposite side of the first channel. The first and second pieces are removably coupled together.

In another exemplary embodiment, the recreational vehicle is formed by coupling a plurality of channel members to a mobile chassis to form a horizontal rectangle of channel members, bonding four wall panels into the horizontal rectangle of channel members and using four vertical channel members to couple adjacent wall panels together, and coupling a roof panel to at least two of the four wall panels using two horizontal roof channel members.

In still another exemplary embodiment, the recreational vehicle comprises an aluminum chassis that includes interlocked first, second, and third segments. An end of the first segment overlaps an end of the second segment. The overlapping ends of the first and second segments comprise a plurality of slots with the slots of the first segment aligned with the slots of the second segment. The third segment has an end having tabs extending through the slots of the first and second segments, the third segment being substantially perpendicular to the first and second segments.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 4 is a door side view of the chassis of FIG. 2.

FIG. 5 is an aft end view of a door side Z-rail of the chassis of FIG. 2.

FIG. 6 is an aft end view of a road side Z-rail of the chassis of FIG. 2.

FIG. 7 is a door side view of a forward door side Z-rail.

FIG. 8 is a door side view of a forward door side Z-rail extension.

FIG. 9 is a door side view of an aft door side Z-rail.

FIG. 10 is a door side view of a door side suspension rail.

FIG. 11 is a detail view of a portion of the Z-rail of FIG. 8.

FIG. 12 is a road side view of a door side vertical suspension plate.

FIG. 13 is a side front view of a first outrigger.

FIG. 14 is a side front view of a second outrigger.

FIG. 15 is a side front view of a third outrigger.

FIG. 50 is a perspective view of a ceiling sub-assembly.

FIG. 51 is a cross sectional view of a sidewall to sidewall joint of the trailer of FIG. 1.

FIG. 52 is a cutaway view of an upper corner of the trailer of FIG. 1.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims.

In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

The present invention is directed to RVs having reduced weight. More particularly, the present invention is directed to a chassis and hull structure that permits increased living volume at reduced vehicle weight using conventional materials available to the RV industry, and that does so without sacrificing features typically offered in higher end RVs. The features of the chassis and hull and the related methods described herein have applicability to a wide range of RVs including both towed RVs such as trailers, self propelled RV's such as motorhomes, and other forms of RVs such as truck and camper combinations.

Figure 1:
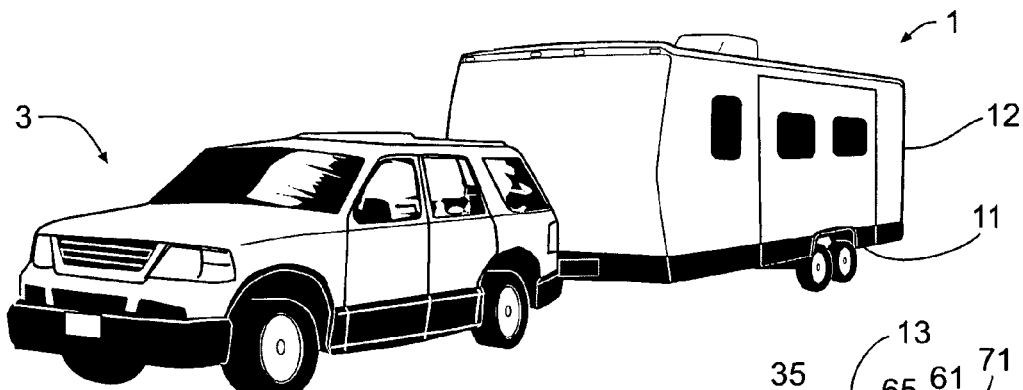
FIG. 1 is a perspective view of a trailer in accordance with an exemplary embodiment of the invention hitched to a tow vehicle.

In FIG. 1, a travel trailer embodiment of the present invention is shown. In FIG. 1, a trailer 1 having a chassis 11 and a hull 12 is coupled to a tow vehicle 3. As shown in FIG. 1, the tow vehicle is a sport utility vehicle, but in some instances may be replaced with any other suitable tow vehicle including, but not limited to, a car, pickup truck, or van. The trailer 1 is a full size, fully featured lightweight conventional RV trailer with a gross vehicle weight rating (GVWR) of 5000 pounds that can be towed by a sport utility vehicle (SUV) 3 with sufficient carrying capacity to stow cargo, water and LPG (such as commercial propane and commercial butane) for temporary remote living. The total carrying capacity of the trailer is 900 pounds. The travel trailer was designed to achieve the minimum possible vehicle weight without sacrificing structural integrity, living space and features. Further, minimal capital investment, simple and intuitive construction, minimal material, flexible assembly methods and competitive advantages yielding a high quality product regardless of employee skill level were achieved.

The trailer 1 has a dry vehicle weight of about 4100 pounds, while a comparative (in regard to space and amenities) vehicle had a dry weight of about 6058 pounds. As such, the trailer 1 weighs about 1950 pounds less than a comparative vehicle, i.e. about 30% less. If a comparison were made between various components of the trailer 1 to similar components of a comparative vehicle, it would be seen that a significant portion of the weight reduction was achieved in the areas of chassis and hull design and construction.

Chassis

Figure 2:
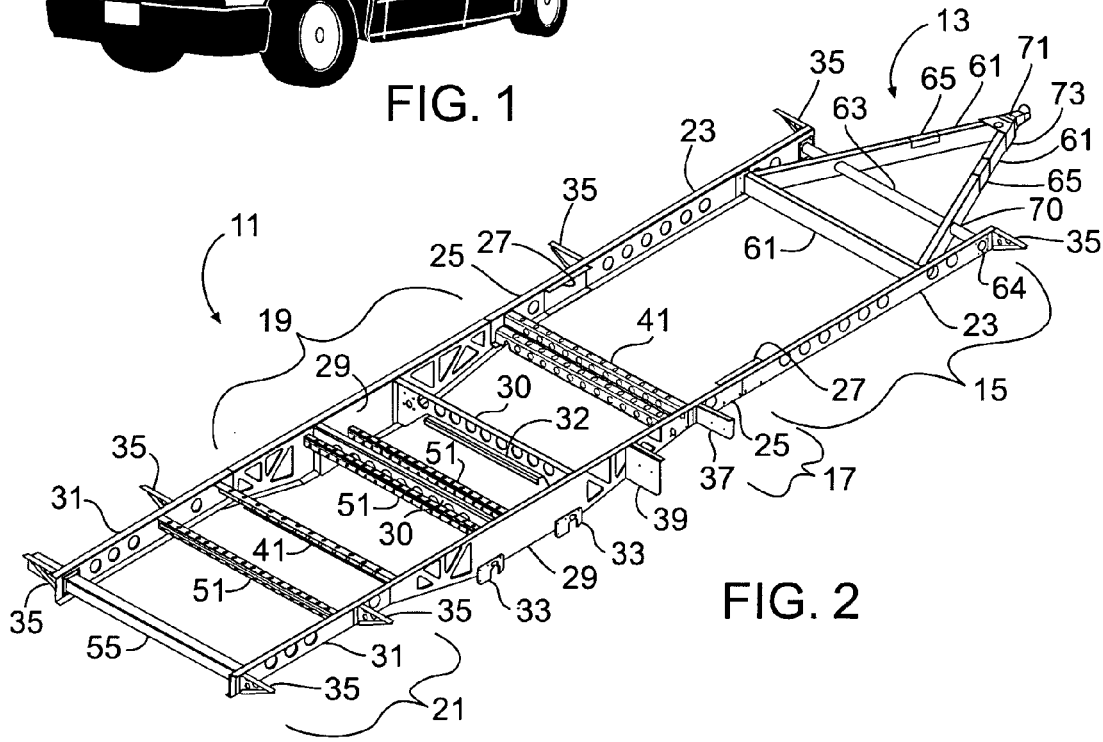
FIG. 2 is an isometric and door side view of the aluminum lightweight modular chassis.
Figure 3:
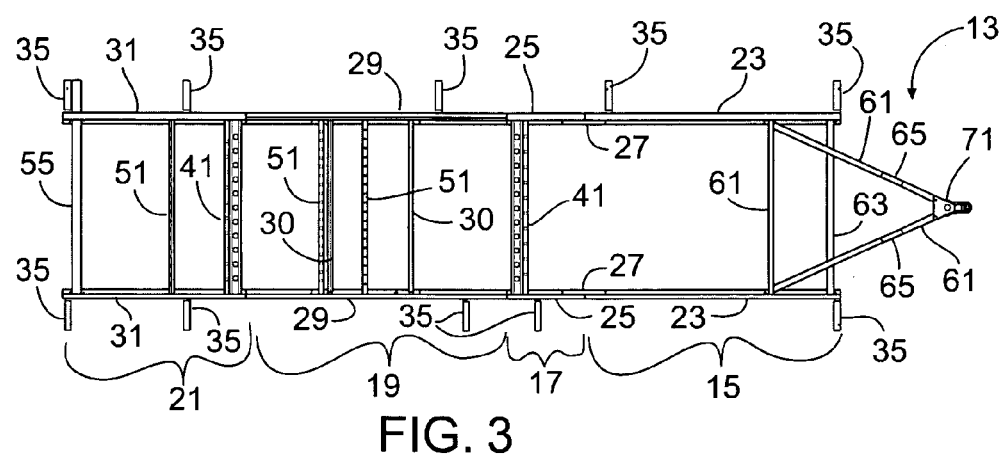
FIG. 3 is a top view of the chassis of FIG. 2.

Referring to FIGS. 2-34, and initially to FIGS. 2-4, the trailer 1 includes a lightweight aluminum chassis designed for high strength, maximum rigidity and torsion resistance. As can be seen in FIGS. 2-4, the chassis 11 includes five distinct sections: an interlocking aluminum A-frame section 13; a forward Z-rail section 15; a Z-rail extension and splice plate section 17; an axle module section 19; and an aft Z-rail section 21. The left/road side 5 and right/door/curb side 7 of the chassis 11 are substantially similar in that each side comprises a forward Z-rail 23, a Z-rail extension 25, a splice plate 27, a suspension rail 29, and an aft Z-rail 31.

The chassis Z-rails 23, 25, 29, and 31 are attached such that they are perpendicular to cross members of the A-frame 13, suspension cross members 30, W-cross members 41, P-cross members 51, and rear cross member 55. Light gauge ribbed aluminum outriggers 35, 37 and 39 are attached to the Z-rails 23, 25, 29, and 31, and provide perimeter hull support and hull load distribution. The A-frame 13 and P-cross members 51 are pre-fabricated welded components.

As best seen in FIGS. 27-34, the A-frame 13 includes rectangular tubes 61 formed into a triangular frame, a cross tube 63, plates 67 and 69, galvanized steel stabilizer supports 65, steel hitch coupler 71, and steel coupler sleeve 73. The aluminum portions of the A-frame 13 (61, 63, 67, and 69) are pre-welded together with the steel pieces being coupled to the A-frame via fasteners.

It should be noted that the A-frame 13 includes a steel sleeved hitch coupler assembly (i.e. hitch coupler 71 and sleeve 73) that encases the front portion of the A-frame and providing additional reinforcement and shear load distribution. As the coupler 71 and sleeve 73 bolt into place, the design promotes assembly without high skilled labor such as welding. The pre-welded A-frame tubular rails 61 intersect at the front, and are inserted into the coupler sleeve 73. Four ½ inch Grade eight bolts are placed through the sleeve 73, the tubes 61 and the hitch coupler 71. The hitch coupler 71 is not welded to the A-frame as might normally be done. Graded ½ inch diameter distorted nuts, graded flat washers and lock washers are fastened to the bolts. The coupler 71 is e-coated for corrosion prevention, but can also be powder coated, galvanized, or otherwise treated to inhibit corrosion.

Among other things, the sleeve 73 mechanically locks the coupler 71 to the A-frame, and reinforces the portion of the A-frame that is subjected to shear, bending, and torsional loads attributed to trailer pitch, roll and/or yaw.

It should be noted that the cross tube 63 extends though and beyond the plates 69 which are used, with plates 67, to bolt the A-frame to the Z-rails 23 of the cassis 11. As such, when the plates 69 are bolted to the Z-rails 23, the ends 64 of the tube 63 extend into corresponding holes in the Z-rails 23 to form a chassis rail interlock. As a result, the A-frame 13 transmits loads through the circular/rectangular cross tube perimeter at the chassis rail interlock, and does not rely strictly on welded or bolted connections to transfer loads to the Z-rails 23.

In addition to the chassis rail interlock, the A-frame is coupled to the Z-rails 23 using 4 fasteners inserted into holes pre-drilled into plates 67 and 69 and Z-rails 23. This aligns the A-frame parallel to the longitudinal axis of the chassis rails.

The Z-rails 23, 25, 27, and 31 have the cross section shapes shown in FIGS. 5 and 6. As the road side and door side rails are substantially similar, FIG. 4, and FIGS. 7-12 show only the door side components of the chassis 11. Any differences between door side components and road side components are identifiable either in reference to FIGS. 2 and 3, or by reference to the description of the chassis 11 contained herein. FIG. 4, which is a door side view of the chassis 11, shows the door side rails 23, 25, 29, and 31 coupled together with suspension rail 29.

In FIG. 7, the forward door side Z-rail 23 is shown with various pre-drilled holes and cutouts. The pre-drilled holes allow an outrigger 35, a splice plate 27, and plates 67 and 69 of the A-frame 13 to be fastened to the Z-rail 23 via mechanical fasteners such as bolts. The Z-rail 23 also includes a through hole/cutout 24 that that the ends 64 of the tube 63 extend into (and possibly through) in forming the chassis rail interlock. The road side Z-rail differs from the door side Z-rail in that it includes additional pre-drilled holes for attaching, preferably by bolting, a second outrigger 35 to the door side Z-rail.

In FIG. 8, road side Z-rail extension 25 is shown. The Z-rail 25 comprises four pre-drilled holes (as does the Z-rail 23) on the forward/hitch end to couple the Z-rail extension 25 to a splice plate 27, two pre-drilled holes adjacent the center of the rail to couple the outrigger 37 to the Z-rail extension 25, and four pre-drilled holes on the aft end for coupling the Z-rail extension 25 to the door side suspension rail 29. It should also be noted that the Z-rail 25 includes three slots 26 (shown in detail in FIG. 11) extending through it. These slots will be discussed in greater detail, but are intended to align with similar slots on the suspension rail 29, and with yokes on a W-cross member.

The splice plates 27 coupled with the extension Z-rails 25 increase the length of the chassis 11 as required. This allows pre-fabricated Z-rails to be used, even if the maximum length available is less than what a particular design requires. In the trailer 1, the forward chassis Z-rails 23 and suspension rails 29 were designed and manufactured with a 10 foot maximum length. In order to meet overall vehicle length requirements, the splice plates 27 and extension rails 25 were used to increase the length of the chassis 11.

In FIG. 9, the door side aft Z-rail 31 is shown. As with the previously described Z-rails, it includes a number of cutouts, pre-drilled holes, and slots. One set of four pre-drilled holes is used to couple the door side aft Z-rail 31 to the door side suspension rail 29. A pair of pre-drilled holes is used to couple an outrigger 35 to the Z-rail 31. A second pair is used to couple a P-cross member to the Z-rail 31. Another set of four holes is used to couple the rear cross member 55 to the Z-rail 31 via plates 57, and to couple a second outrigger 35 to the Z-rail 31. On the road side, this set of holes surrounds a rectangular hole through which the rear cross member 55 extends. As with the Z-rail extension 25, the aft Z-rail 31 includes slots 26 for interconnection of the rail with a suspension rail 29 and a W-cross member 41.

In FIG. 10, a door side suspension rail 29 includes various pre-drilled holes, slots, and cutouts. On the left/aft end, four pre-drilled holes align with pre-drilled holes on Z-rail 31 and are used to couple, preferably by bolting, the Z-rail 31 and the suspension rail 29 together. On the right/forward end, another set of four holes aligns with holes on the Z-rail extension 25 and are used to couple, preferably by bolting, the Z-rail 25 and the suspension rail 29 together. A pair of pre-drilled holes is used to couple the outrigger 39 to the suspension rail 29. Two sets of three vertically aligned holes are provided with each set coupling a suspension cross member 30 to the suspension rail 29. Two pairs of vertically aligned pre-drilled holes are also provided where each pair couples a P-cross member 51 to the suspension rail 29. Two sets of three horizontally aligned pre-drilled holes are provided with each set coupling a vertical suspension plate 33 (see FIGS. 2 and 12) to the suspension rail 29. The suspension rail 29 also includes two sets of slots 26 for interconnecting the rail 29 with W-cross members 41 and rails 25 and 31.

Vertical suspension plates 33, as shown in FIGS. 2 and 12, attach to the chassis to center an axle. The axles (not shown) are installed to the vertical suspension plates 33, and chassis rail axle rail bottom return flange (not shown) using ½ inch diameter Alcoa C50 steel two piece fasteners while the chassis is in the upside down configuration on a flat surface or right side up subsequent to chassis assembly. Torsion axles rated at 2500 pound capacity were selected for ease of installation in comparison with existing leaf spring based suspension systems. The chassis 11 does not require shock absorbers because of the inherent energy absorbing characteristics of the rubber in the torsion axles. Although different embodiments may utilize different axle systems, it is contemplated that the use of a torsion axle system or a leaf spring axle system is advantageous.

FIGS. 13-15 provide side views of the outriggers 35, 37, and 39. The outriggers provide additional support to portions of the hull 12 that overhang the chassis 11.

Figure 16:
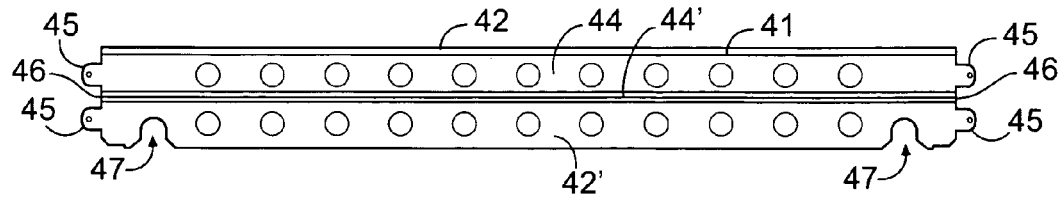
FIG. 16 is a front view of an aft W-cross member.
Figure 17:
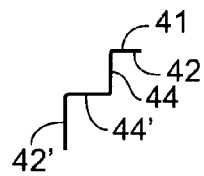
FIG. 17 is a road side end view of the W-cross member of FIG. 16.
Figure 18:
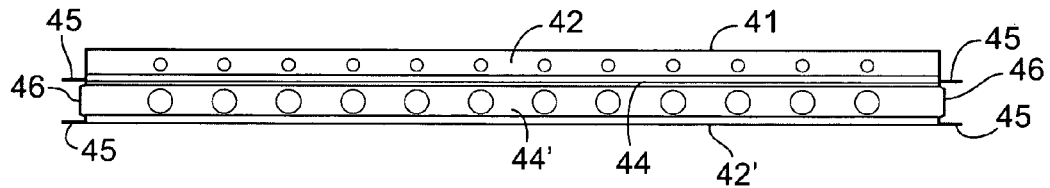
FIG. 18 is a top view of the W-cross member of FIG. 16.

FIGS. 16-18 show a W-cross member 41 of the two W-cross members of the chassis 11 with FIG. 16 being a front view, FIG. 17 a side view, and FIG. 18 a top view. Each W-cross member 41 has perpendicular side flanges 42 and 42' coupled together by adjacent perpendicular middles segments 44 and 44'. Each W-cross member 41 also includes a center index tab 46 and two yokes 45 on each end. The center index tabs and yokes are sized and positioned to correspond to the size and position of slots 26 of the Z-rails 25 and 31, and the suspension rails 29. If needed, the chassis Z-rail pre-cut slots 26 may simply be reoriented to rotate the aft and forward rail orientation to achieve desired curvature along the length of the axis 11.

Figures 19, 20, 21:
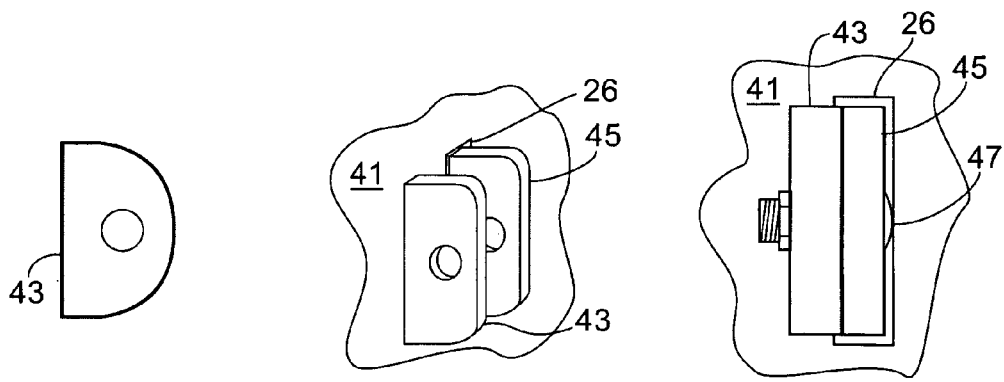
FIG. 19 is a front view of a semi-circular tab.
FIG. 20 is a first detail view showing the tab of FIG. 19 being coupled to the a W-cross member.
FIG. 21 is a second detail view showing the tab of FIG. 19 coupled to a yoke ross member.
Figure 22:
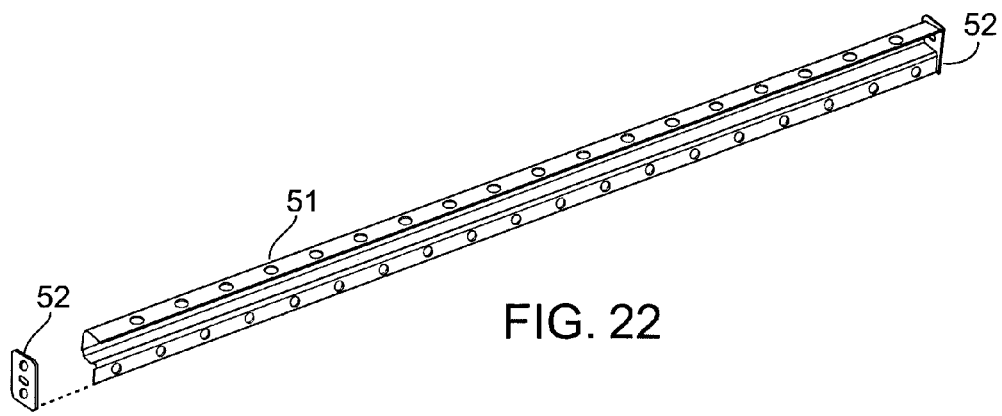
FIG. 22 is a perspective view of a P-cross member.

During assembly of the chassis 11, the center index tabs and yokes are aligned and inserted through the pre-cut slots 26. Once the yokes 45 extend through and beyond the slots 26, a semi-circular tab 43 is attached to each yoke to prevent it from sliding out of the slot. As shown in FIGS. 19-21, the semi-circular tab 43 is positioned parallel and adjacent with a yoke 45, and a fastener 47 is used to couple the semi-circular tab 43 to the yoke 45. As such, each yoke is permanently attached to an aluminum semi-circular tab with a fastener such as an Alcoa two piece fastener. This patterned interlock of the W-members and rails provides a simple intuitive assembly that only requires low skilled labor for fastening. Interlocking ensures that the W-cross member and the chassis Z-rails are perpendicular to each other, are properly aligned through final assembly, and provides the chassis with additional lateral and torsional strength.

As will be discussed, the W-cross members also function to support one half the weight of a tank, provide a structural urethane adhesive bonding surface for laminated floor attachment and support, and provide LPG CSST/black pipe and electrical harness support.

The W-cross members 41 are CNC manufactured from 3/16 inch thick aluminum, and include lightening holes to remove unnecessary weight. Lightening holes on a top flange provide a locking surface for using a structural urethane adhesive to attach a laminated floor to the chassis 11.

The P-cross members 51 (see FIGS. 2, 3, and 22) are also CNC manufactured aluminum. Two end plates 52 with index slots are pre-welded to each end of the cross member and are used to couple the P-cross members 51 to the aft Z-rails 31 and the suspension rails 29 using fastener plates 52 and 3/8 UNC AVK hex nutserts. The P-cross members 51 add lateral strength to the chassis rails.

Figure 23:
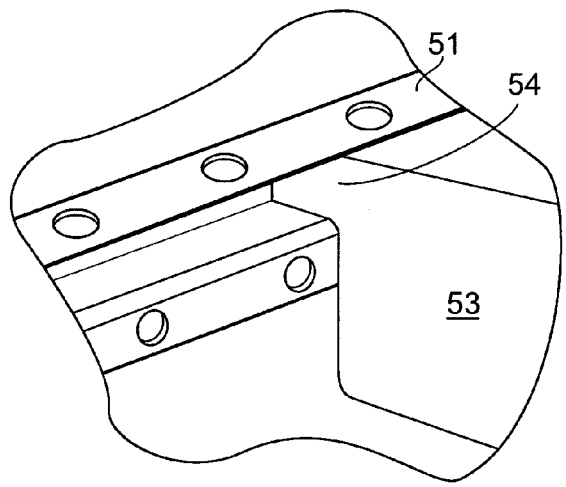
FIG. 23 is a partial view of a P-cross member supporting a tank.
Figures 24, 25:
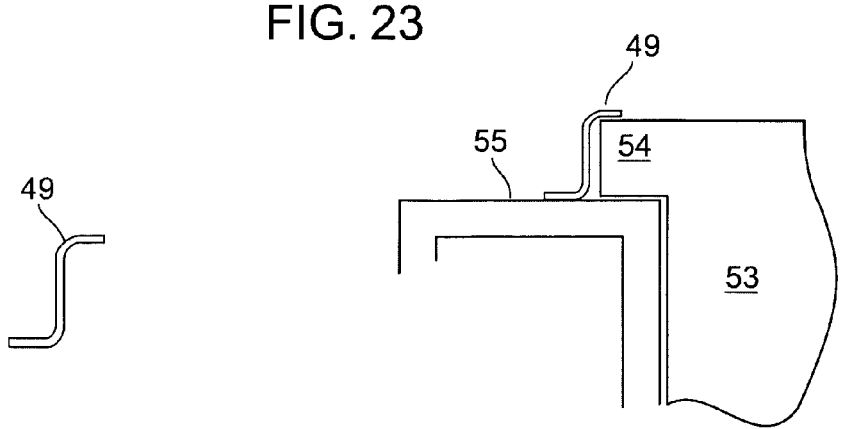
FIG. 24 is an end view of a Z-bracket.
FIG. 25 is a side view of a rear cross member supporting a tank.

It should also be noted that the shape of the P-cross members 51 function to retain a flange 54 of a tank 53 as illustrated in FIG. 23. On the opposite side of the tank 53, a similar flange 54 is sandwiched between a Z-bracket 49 (see FIG. 24), and the cross member 55 (see FIG. 25), or is supported by a W-cross member 41, or on a flange 32 of a suspension cross member 30. This locks the tank 53 into a specified location, permits the P-cross member 51 to support one half of the tank and content weight, and eliminates both vertical and lateral tank movement, essentially capturing the tank. The tanks 53 are specifically designed to interlock with the P-cross members 51 and are easily removed from the chassis 11 for service by removing a P-cross member 51. In chassis 11, the P-cross members 51 are position to support three tanks, one between the aft P-cross member 51 and the cross member 55, a second between the middle P-cross member 51 and the aft W-cross member, and a third between the forward P-cross member 51 and the flange 32 of the cross member 30.

Figure 26:
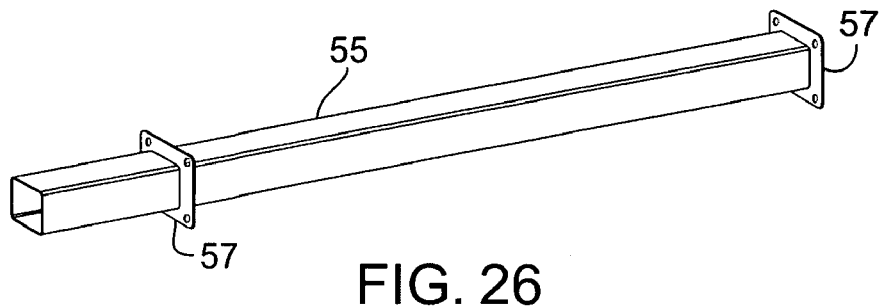
FIG. 26 is a perspective view of a rear cross member.
Figure 27:
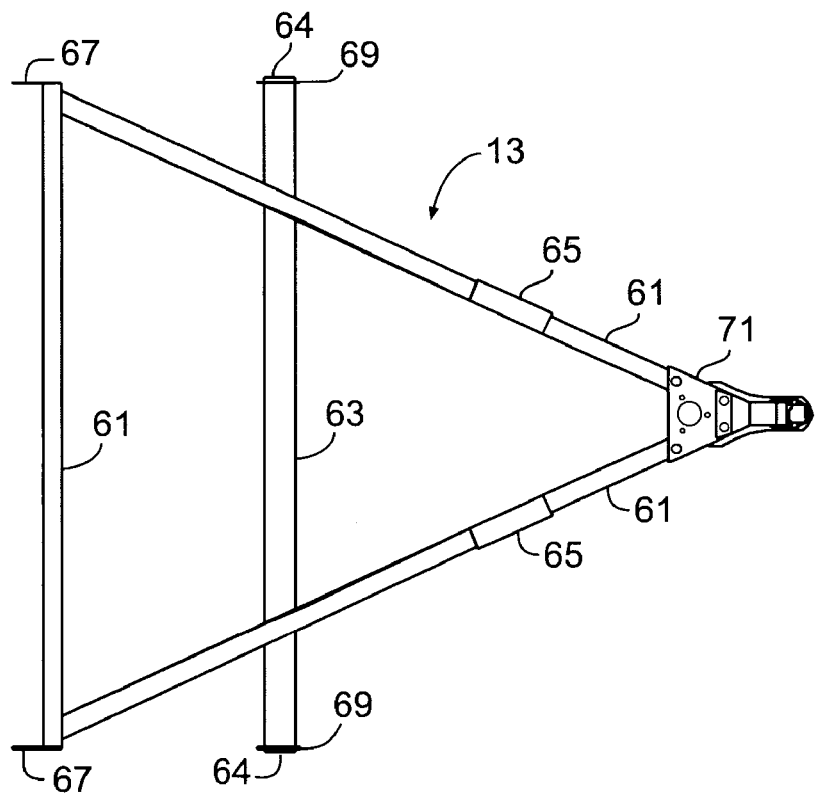
FIG. 27 is a top view of an A-frame.
Figure 28:
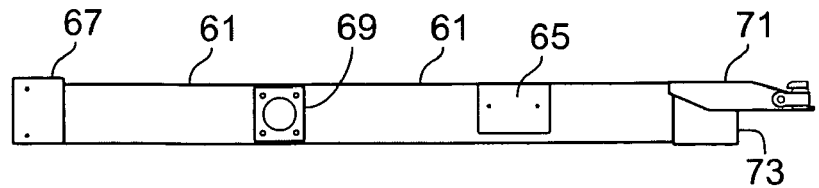
FIG. 28 is a side view of the A-frame of FIG. 27.
Figure 29:
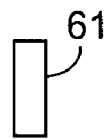
FIG. 29 is an end view of a frame tube of the A-frame of FIG. 27.
Figure 30:
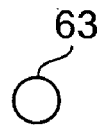
FIG. 30 is an end view of a cross tube of the A-frame of FIG. 27.
Figure 31:
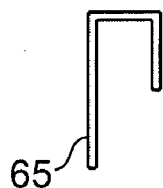
FIG. 31 is a front view of an A-frame mounting plate of the A-frame of FIG. 27.
Figure 32:
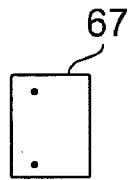
FIG. 32 is a front view of a first cross tube A-frame mounting plate of the A-frame of FIG. 27.
Figure 33:
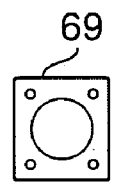
FIG. 33 is a front view of a second A-frame mounting plate of the A-frame of FIG. 27.
Figure 34:
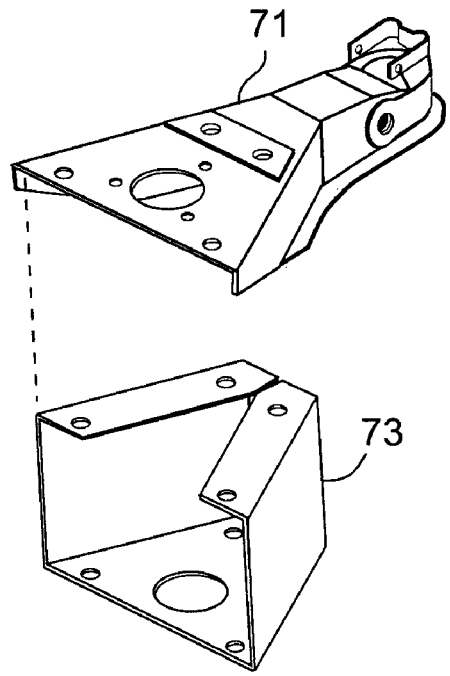
FIG. 34 is an exploded view of a hitch assembly.

As is best seen in FIG. 26, the rear cross member 55 is constructed from 4 inch O.D. aluminum tube with flanges 57 welded at specified locations. To simplify installation a square hole that locates the rear cross member is cut into the road side aft rear cross member 31. The rear cross member is inserted 55 into the square opening. The rear cross member 55 sets the width between the aft Z-rails 31, and maintains rail to cross member perpendicularity. Further, it: (a) increases chassis lateral and torsional strength; (b) supports 50% of a black tank weight; (c) provides a Z-bracket 49 installation surface; (d) accommodates stabilizer jack bracket installation; (e) serves as a sewer hose enclosure; and (f) provides an attachment for a rear bumper or skirt.

Most of the components of the chassis 11 comprise CNC (Computer Numeric Code) fabricated aluminum. As such, CNC fabricated aluminum was used in forming the chassis cross members 30, 41, 55, and 55, Z-rails 23, 25, 29, and 31, and the A-frame 13. Although the chassis 11 may comprise any suitable material or combination materials, and although steel is typically the chassis material of choice in the RV industry (primarily due to availability, manufacturability and weldability, and competitive cost), the use of aluminum provides a number of benefits. One benefit is that the use of aluminum reduces corrosion concerns. With minimal corrosion concerns, chassis such as the chassis 11 may be assembled and inventoried outside without weather damage.

The components of chassis 11 are fastened together primarily using fasteners inserted through pre-drilled holes. As such, component welding during assembly is eliminated and will not be required at the assembly plant. The fasteners used to couple chassis components together are primarily Alcoa single and two piece aluminum fasteners, although other mechanical fasteners were used as well. Such fasteners include graded hex head bolts and self drilling Tek-screws with a corrosion inhibitor were required for attaching the coupler, trailer lift, and P-clamps for electrical harnesses and LPG plumbing. It is contemplated that alternative embodiments may utilize different fasteners and/or different methods of fastening components together.

One advantage of a "bolt together" chassis (i.e. one having pre-fabricated components coupled together using fasteners rather than welding) is that there is no need to use highly skilled level welders to assemble the chassis. This in turn helps to minimize factory capital equipment and maintenance costs. Another advantage is that the chassis parts, prior to assembly, may be nested, strapped, and shipped on a pallet for just-in-time delivery to an assembly facility.

Each component of the chassis 11 has an inherent design purpose. Combinations of pre-punched/cut holes, slots, index tabs and yokes are cut or punched into each part to promote the following: (1) increased strength through mechanical interlocks; (2) simple, intuitive installation and chassis assembly error reduction; (3) assembly time, and anticipated labor time decrease; (4) product quality increase, and (5) material and weight reduction with judicious material application. Pre-punched holes along the main rails are provided for electrical and plumbing p-clamp supports. AVK hex nutserts are strategically placed for electrical ground connections. There is no need for drilling holes during assembly which promotes consistent sub-assembly and increased product quality in contrast with present construction methods.

Specific areas of the modular chassis design can be revised easily to accommodate various floor plans with minimal revisions. Only the fore and aft Z-rails 23 and 31 will need adjustment for shorter or longer floor plans while the structure of the axle module 19 and the A-frame 13, the more complex chassis components, remain intact. The modular chassis design permits future structural enhancements and weight reduction as deemed necessary without severely impacting design, development and production efforts. Product improvements can be incorporated a component at a time so that changes can be developed, reviewed and appropriately staged into production. This design is a significant change towards developing and assembling a chassis that can be constantly improved upon as desired.

The tanks 53 preferably comprise rotomolded polyethylene 40 gallon gray and 40 gallon black waste tanks, and a 40 gallon rotomolded polyethylene fresh water tank. The water tank is preferably designed to fit in the chassis axle module, above the trailer axles. At one end the tank is supported by the suspension cross member return flange 32 designed specifically for this application. The opposite side is supported by a bolt on P-cross member 51. In this configuration the tank is centrally located and will work for many floorplans without relocation. Placing the tank in this area also minimizes trailer hitch load shifts associated with filling the water tank to capacity. The use of removable tank supports permit serviceability of the tanks. Bolts attaching the tank supports to the chassis rails are easily accessible from the exterior of the chassis rails. Also, aluminum brackets permanently mounted to the W-cross members immobilize the tanks.

Hull

Figure 35:
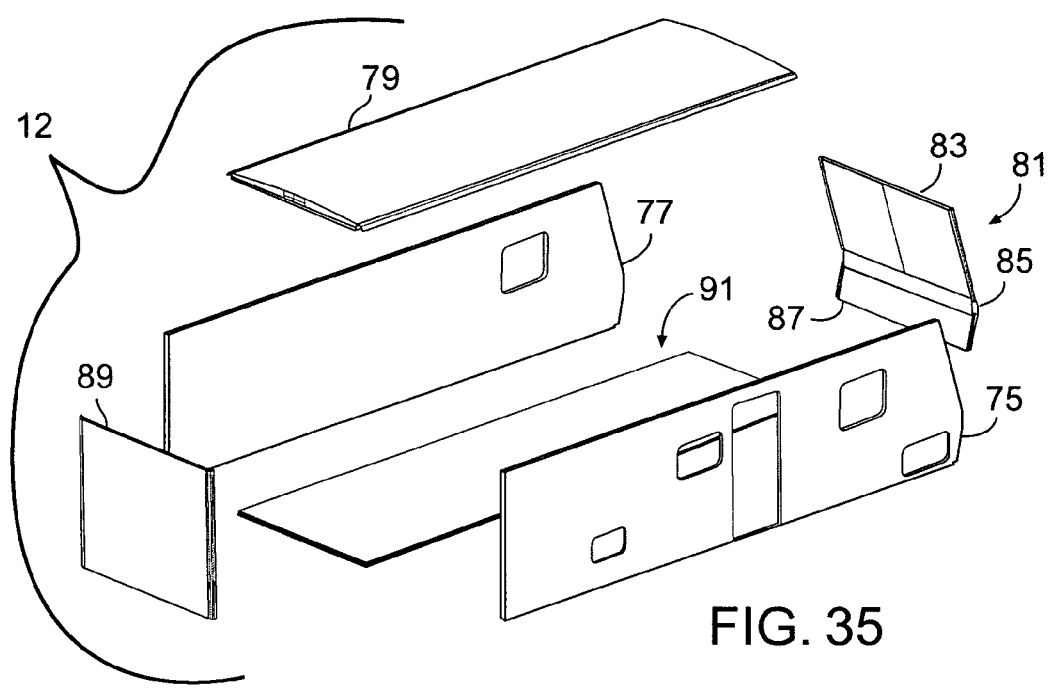
FIG. 35 is an exploded view of a hull assembly.
Figure 36:
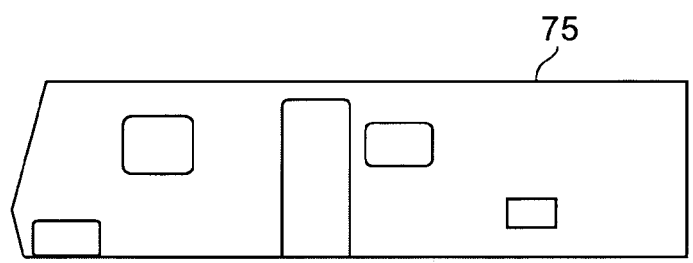
FIG. 36 is a road side view of a door side sidewall of the trailer of FIG. 1.
Figure 37:
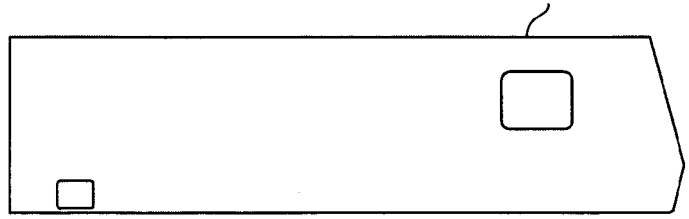
FIG. 37 is a door side view of a road side sidewall of the trailer of FIG. 1.
Figure 38:
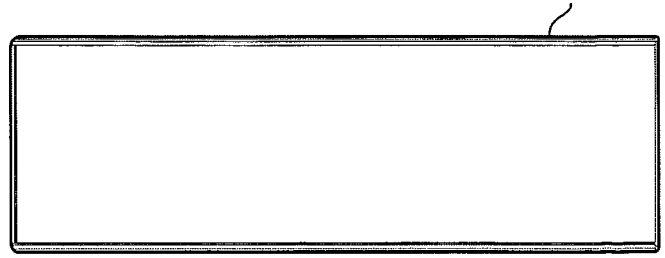
FIG. 38 is a bottom view of a ceiling panel of the trailer of FIG. 1.
Figure 39:
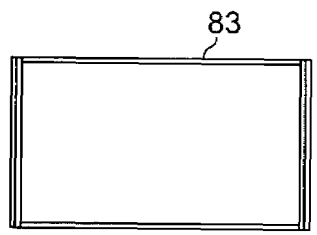
FIG. 39 is a front view of a top front wall panel of the trailer of FIG. 1.
Figure 40:
FIG. 40 is a front view of a middle front wall panel of the trailer of FIG. 1.
Figure 41:
FIG. 41 is a front view of a bottom front wall panel of the trailer of FIG. 1.
Figure 42:
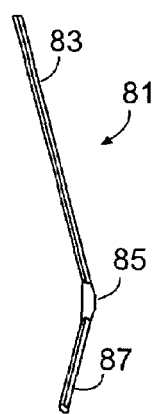
FIG. 42 is a side view of a front panel assembly of the trailer of FIG. 1.
Figure 43:
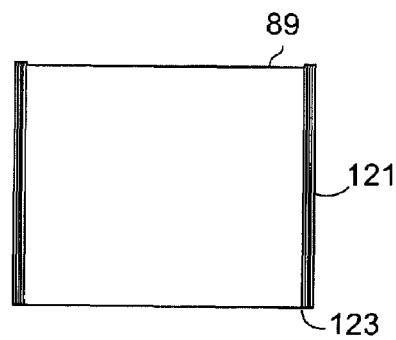
FIG. 43 is a front view of a rear panel assembly of the trailer of FIG. 1.
Figure 44:
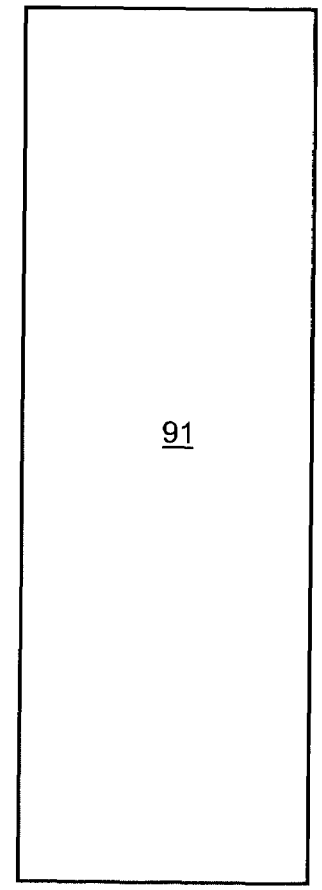
FIG. 44 is a top view of a floor assembly.

As can be seen in FIGS. 35-44, particularly in FIG. 35, the hull 12 includes a laminated floor 91, frameless sidewalls 75 and 77, a front cap 81, a frameless laminated rear wall 89, and a laminated curved ceiling 79. The floor 91, sidewalls 75 and 77, front cap 81, rear wall 89 and ceiling 79 are preferably pre-formed and then assembled using two piece aluminum extrusions to form joints between them. The hull 12 can be assembled without any welding.

The hull 12 may be constructed atop the chassis 11 in a conventional manner, or off-chassis construction is also possible using the design described herein. An advantage of the described modular hull construction and associated house systems is that they may be manufactured off line and independent of the chassis; while the chassis and associated subsystems are installed and tested, i.e. parallel versus serial manufacturing. Therefore, for example, if an issue arises with a particular hull during manufacture, it may be removed from the assembly line with minimal impact to production throughput. Further, higher volume flow may be attained with parallel manufacturing.

In the embodiment shown, the sidewalls 75 and 77 are formed without extrusions, and the floor 91, front cap 81, rear wall 89, and ceiling 79 are all formed with extrusions incorporated into two sides of the cap 81, rear wall 89, and ceiling 79, and into four sides of the floor 91. Assembly can then be accomplished by: (a) inserting the rear wall 89 into the appropriate floor extrusions; (b) adding the side walls 75 and 77 into the floor and rear wall extrusions; (c) adding the front cap 81 so that it fits in the remaining floor extrusion and receives the forward edges of the side walls 75 and 77 into two vertical side extrusions incorporated into the front cap 81; and (d) fitting two sidewall receiving extrusions of the ceiling onto the sidewalls 75 and 77. As a result, some extrusions of the hull 12 couple the laminated floor 91 to the laminated side walls 75 and 77, rear wall 89, and front cap 81. Other extrusions couple the sidewalls 75 and 77 to the rear wall 89 and the front cap 81. Still other extrusions couple the sidewalls 75 and 77 to the ceiling 79.

Each extrusion joint of the hull 12 includes a pair of elongated extrusions coupled together to form an elongated channel. As such, each pair of extrusions used to form a joint is an elongated "channel member" in that they form a member comprising a channel. Although paired extrusion channel members are preferred, it is contemplated that other embodiments may utilize single extrusion channel members and/or channel members that include more than two extrusions. As discussed above, at least one extrusion of a channel member is incorporated into two sides of the front cap 81, rear wall 89, and ceiling 79, and into four sides of the floor 91. In some instances, all channel member pieces will be coupled together before coupling portions of the hull together. In other instances a second extrusion of a channel member which is not part of a pre-formed floor, wall, cap, or ceiling will be joined to a first extrusion after positioning portions of the hull relative to each other in order to lock them in place.

In the embodiment shown, the extrusions of each channel member can be viewed as including a primary, hollow body extrusion and secondary interlock extrusion coupled together to form a channel. The primary extrusion is the largest portion of the channel member and includes a hollow section extending the length of the extrusion in a manner similar to that of a tube. For floor and ceiling channel members, the hollow section of the primary extrusion is laminated into the floor or ceiling. The extrusions shown herein were designed to minimize material thickness and weight.

The primary and secondary extrusions of each channel member are formed using an aluminum extrusion process that allows intricate details to be developed and manufactured for a specific purpose. Their designs promote simple frameless lightweight wall design and construction. Channel member extrusions are preferably mechanically fastened together using self drilling screws coated with a corrosion inhibitor. Fasteners are protected with cover strips and lower skirts that are installed into design integrated cavities.

The use of channel member to form joints causes the channel members to index and capture all the sides of each of the vertical sidewall panels 75 and 77, eliminating dimensional assembly errors. At least an exterior fiberglass surface of each of the sidewall panels 75 and 77 is adhered to a side of each channel that it is fitted into, and is thus locked into the channel without any need for mechanical fasteners. The frameless, composite laminated sidewalls 75 and 77 preferably consist of 0.045 inch thick exterior fiberglass adhered to 2.0/3.0 pound per cubic foot density, 1.5 inch thick expanded polystyrene (EPS) that is bonded to pre-treated 0.025 vinyl clad aluminum interior panels. Variants of this construction may consist of light weight interior plywood panels in lieu of the aluminum interior panels. A preferred wall manufacturing process utilizes extruded urethane adhesive and vacuum bonding, or PUR adhesive and pinch rolling.

In some instances the trailer 1 may include a slide-out room system. In such instances, the use of a cable-drive system such as that produced by NORCO may prove advantageous.

Channel Members

Figure 45:
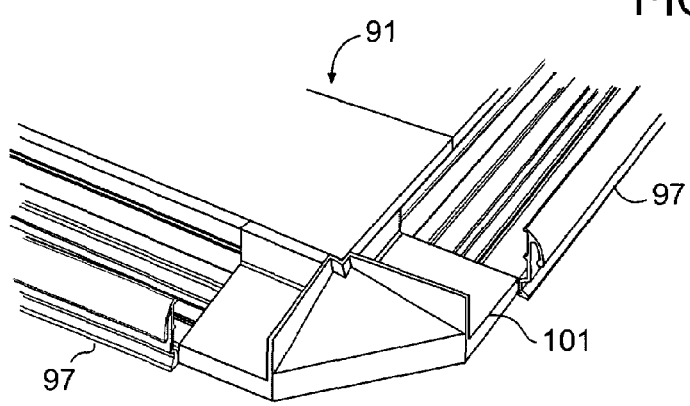
FIG. 45 is a perspective view of a corner of a floor assembly of FIG. 43.
Figure 46:
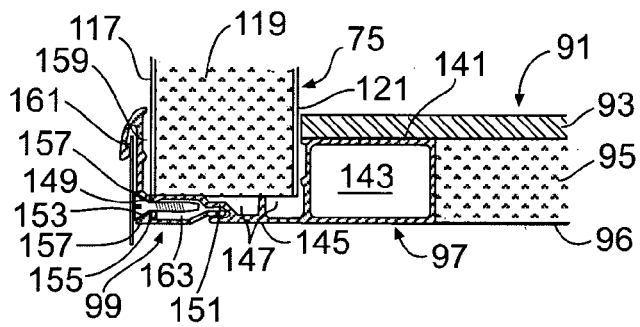
FIG. 46 is a cross section view of a floor and sidewall joint of the trailer of FIG. 1.
Figure 47:
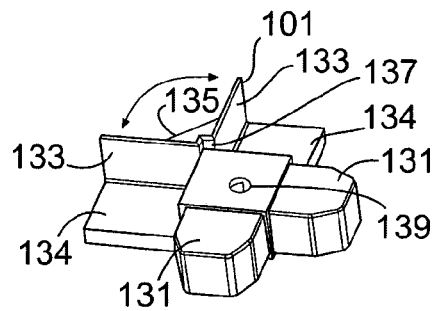
FIG. 47 is a perspective view of a nylon corner connector.

FIGS. 45-47 provide additional information on channel members of the floor 91. The perimeter of the floor 91 includes four two piece channel members 97 providing perimeter channels joined at the corners of the rectangular floor. The channels members 97 are each formed by coupling together extrusions 99 and 97, and are coupled together using connector 101.

FIG. 46 provides a cutaway view of the elongated extrusions 97 and 99, the sidewall 75, and the floor 91. The sidewall 75 includes surface layers 117 and 121, and a filler layer 119. The floor 91 includes surface layers 93 and 96, and a filler 95. The primary extrusion 97 includes an upper bonding surface 141 bonded to layer 93, a cavity 143 for corner connector (101) insertion during assembly of the channel member frame of the floor 91, a lower bonding surface 145 bonded to layer 96, channel 147 (for receiving sidewall 75), a bottom sidewall support 149, and an extrusion interlock cavity 151 (a portion of the secondary extrusion 95 extends into this cavity). The primary extrusion 97 also includes a fastener flange 153 that extends along the length of the extrusion 97 adjacent to a starter groove 155 of the extrusion 99. The fastener flange 153 may be substantially planar, or may be shaped to better receive and align the portion of the extrusion 99 adjacent the starter groove 155.

The secondary extrusion 97 includes a starter groove 155 for self drilling fasteners that includes tapered groove sidewalls 157 adjacent a floor connecting the tapered groove sidewalls, the starter groove 155 providing for recessed fastener installation. The secondary extrusion 97 also includes grooves and nubs 159 for adhesive flow and thickness, and a skirt cavity interlock 161 for receiving and retaining the skirt shown covering the screw.

The cross sections of the extrusions 97 and 99 remain substantially unchanged along their entire length. As a result, the cavity 143 extends along the length of the extrusion 97, with the cavity 143 being open at the ends of the extrusion, but substantially closed along its length, i.e. it doesn't have any paths for fluid to pass between the cavity and the exterior of the extrusion 97 other than through the open ends of the extrusion. Similarly, the starter groove 155 extends along the length of the extrusion 99. Also, the channel 147 extends along the length of the extrusions 97 and 99 with extrusion 99 providing an outside wall of the channel 147, and the extrusion 97 providing the floor and inside wall of the channel 147. Further, the primary and secondary extrusions 97 and 99 cooperate to form a fastener and condensation/water diversion cavity 163 that extends along the length of the extrusions 97 and 99.

FIG. 47 provides a perspective view of the connector 101 (first shown in FIG. 45) used to couple together the two piece channel members formed by coupling extrusions 97 and 99 together. The preferred connector 101 is a nylon mold injected corner connector that was designed, developed and manufactured to simplify laminated floor perimeter frame assembly, reduce manufacture time, and associated assembly cost. The connector 101 includes two perpendicular leg inserts 131, vertical flanges 133, horizontal flanges 134, web 135, raised corner 137, and through hole 139. The leg inserts 131 are inserted into rectangular cavities in extrusions 97. The horizontal flanges 134 extend the bottom of the channel formed by extrusions 97 and 99. The vertical flanges 133 index a wall inserted into the adjacent extrusions to properly position the wall relative to the corner. The raised corner 137 facilitates proper positioning of a top layer of the floor 91. The through hole 139 provides a mechanism for fastening the floor 91 to the chassis 11.

The corner connector 101 is the primary means for connecting perpendicularly adjacent two piece (97 and 99) aluminum channel members when assembling the laminated floor 91 frame perimeter. The connector 101 is force fitted into each of the four corners comprising the perimeter frame of the floor 91. It should be noted that: (a) the 90 degree angles at each corner of the floor perimeter frame are ensured during assembly with inherent right angle stops designed into the connector; (b) the edge of each leg insert 131 is tapered on both sides to initiate installation into the hollow extrusion 97 (i.e. into cavity 143); (c) the vertical flanges 133 index (i.e. help position) the rear wall, sidewalls and front cap during hull assembly to ensure they are properly located;.and (d) raised corners (137) index a plywood floor underlayment of the floor 91 prior to lamination, and vacuum bonding or pinch rolling. This simplifies plywood placement during floor material set-up prior to lamination and respective bonding process. Moreover, the through hole 139 designed into the fastener 101 establishes the location of a two piece countersunk floor fastener (such as those provided by Alcoa) used to position and attach the laminated floor 91 to the chassis 11 outrigger.

Whether the hull 12 is pre-assembled or not, it is contemplated that the floor 91 will generally be assembled prior to coupling it to the chassis 11. In coupling it to the chassis 11, adhesive can be applied to the points at which the floor 91 and the chassis 11 come in contact (such as on the uppermost flange of the W-cross members of the chassis 11), and connectors can be used in conjunction with the through holes 139 to couple the floor 91 to the chassis 11.

In some instances, the floor 91 may be formed using the following steps: (a) the two piece aluminum floor extrusions (i.e. the combination of 97 and 99) of the channel members are cut to specified lengths; (b) the nylon mold injected connectors 101 are inserted into the pre-cut hollow extrusions 97 to create the floor perimeter frame (structural aluminum welding is not required); and (c) the floor to sidewall aluminum extrusions and the corner connectors are laminated into the composite floor, becoming an integral composite assembly.

The preferred floor 91 is constructed using high density 3 pound per cubic feet, 1 inch thick expanded polystyrene (EPS) foam laminated between a coated aluminum 0.010 inch underbelly and ¼ inch thick urethane fiber reinforced engineered structural panels manufactured by Space Age Synthetics. In some instances plywood, or some other wood fiber product, may be used in lieu of the urethane panels.

The channel members (extrusions 97 and 99) framing the floor are designed to transfer hull weight to the chassis via the outriggers 35 of the chassis 11. The floor 91 obtains supplemental support by the top flange of the rail and cross members of the chassis 11. The floor is secured to the chassis with structural urethane adhesive; e.g. Sikaflex 552, and two-piece countersunk shoulder floor fasteners such as those provided by Alcoa. The two-piece countersunk fasteners are used to clamp the laminated floor 91 to the chassis 11, while the adhesive cures, providing redundant structural fastening. The urethane adhesive provides the primary structural bonding between the chassis 11 and the laminated floor 91 (and the hull 12), in addition to enhanced load distribution, sound deadening and shock absorption.

Figure 48:
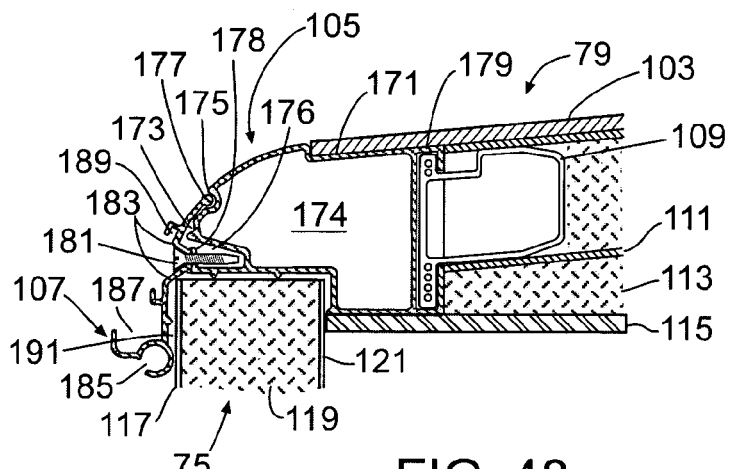
FIG. 48 is a cross section view of a sidewall and ceiling joint of the trailer of FIG. 1.
Figure 49:
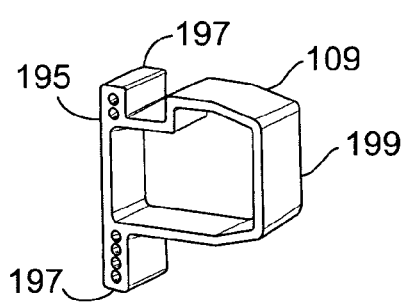
FIG. 49 is a perspective view of a nylon nylon roof rafter connector.

FIGS. 48-50 provide details on the joint between the ceiling 79 and each sidewall 75 and 77, with the joint between the ceiling 79 and the sidewall 75 being used for illustration. As with the joint between the floor and the sidewalls, a two extrusion channel member includes a primary extrusion 105 and a secondary extrusion 107 coupled together to form a channel for receiving an upper edge of a sidewall. At least the outer side of the channel (provided by secondary extrusion 107) prevents outward movement of the sidewall, and is bonded to an outer sidewall surface to capture the sidewall and bond it with the ceiling 79; eliminating the wooden and aluminum stud framed wall and ceiling typically required to mechanically fasten completed panel structures together.

The primary ceiling to sidewall extrusion 105 includes a recess and bonding surface 171 for bonding to an exterior lightweight plywood panel 103, a rubber roof/thermoplastic polyolefin (TPO) cut line groove 173, a secondary extrusion top interlock recess 175 that is also a cavity for TPO/rubber roof compression and capture, a C-channel 179 that allows simple and effective installation of nylon mold injected rafter connectors 109 and rectangular aluminum tube ribs 111, and a cavity 174. The primary extrusion 105 also includes a fastener flange 178 that extends along the length of the extrusion 105 adjacent to a starter groove 181 of the extrusion 107. The fastener flange 178 may be substantially planar, or may be shaped to better receive and align the portion of the extrusion 107 adjacent the starter groove 181.

The secondary ceiling to sidewall extrusion 107 includes the starter groove 181, and a thickened interlock rim 177 (that fits into the interlock recess 175). The extrusion 107 also includes an integrated awning attachment 185, an integrated water collection and drip rail 187, a fastener cover recess 189, and a structural adhesive bonding cavity 191.

The cross sections of the extrusions 105 and 107 remain substantially unchanged along their entire length. As a result, the cavity 174 extends along the length of the extrusion 105, with the cavity 174 being open at the ends of the extrusion, but substantially closed long its length, i.e. it doesn't have any paths for fluid to pass between the cavity and the exterior of the extrusion 105 other than through the open ends of the extrusion. Similarly, the starter groove 181 extends along the length of the extrusion 107. Also, the channel 191 extends along the length of the extrusions 105 and 107 with extrusion 107 providing an outside wall of the channel 191, and the extrusion 105 providing the top and inside walls of the channel 191. Further, the primary and secondary extrusions 105 and 107 cooperate to form a fastener and condensation/water diversion cavity 176 that extends along the length of the extrusions 105 and 107. The ends of the cavity 176 are preferably aligned with the ends of vertical corner channel members such that water is diverted into similar diversion cavities of such channel members.

The two piece lightweight aluminum ceiling to sidewall extrusions 105 and 107 parallel the sidewalls 75 and 77 longitudinally along the length of the hull 12. The nylon mold injected roof rafter connectors 109 perpendicularly interlock rectangular aluminum ribs 111 to the ceiling primary extrusion 105 C-channel 179, thus creating the minimal skeletal aluminum framework of the ceiling 79. The aluminum tubular ribs 111 are placed at designated ceiling pre-formed panel grooves (not shown). Formation of the ceiling 79 does not require welding or the labor resources associated with stick-and-tin and hardwall product manufacturing.

The preferred ceiling 79 consists of 1.5 pound density pre-formed expanded polystyrene foam (EPS) panels 113 laminated between ⅛ inch thick lightweight plywood panels 103 and 115. The completed laminated ceiling 79 sits atop the laminated side walls 75 and 77 analogous to a shoe box top. Aluminum angles (not shown) riveted to the ceiling front and rear edge index and capture the front cap and rear wall. The ceiling 79 is bonded to the vertical sidewalls 75 and 77 of the hull 12 with structural urethane adhesive.

When formed, the ceiling 79 includes extrusions 105 coupled together by the nylon roof rafter connectors 109 and ribs 111. The nylon roof rafter connectors 109 were designed to streamline formation of the laminated ceiling 79 by eliminating welding surface preparation, set-up time and associated labor time and expense. The connector 109 promotes simple, intuitive ceiling frame construction, and does not require intensive mechanical assembly techniques; i.e. mechanical fastening, elaborate set-up, and/or welding. Each of the connectors 109 includes a vertical flat edge 195 (with upper and lower flanges 197) that is inserted into the ceiling extrusion C-channel 179 designed at the interior edge and slide to designated rib locations. Each connector 109 includes a plug 199 with a tapered edge that is placed into, and interlocks with, an associated aluminum rectangular stretch formed rib 111. The plug 199 remains perpendicularly locked within the tubular rib 111.

As shown in FIGS. 51 and 52, aluminum extrusions 123 and 124 were designed to provide channels 223 and 221 to capture the outer sidewall and front cap/rear wall panels (with the joint of wall 75 to the rear wall 89 being used for illustration), preferably by bonding to the fiberglass surfaces 117, and 129, thereby eliminating the wooden and aluminum wall framework typically required to mechanical fasten completed wall structures together. Similar to the other joints, a two piece extrusion channel member is formed from extrusions 123 and 121. The channel member cooperate to form the two channels 221 and 223.

The primary wall to wall extrusion 123 includes a cavity 201 for spacing, strength, and moisture expulsion, two perpendicular inside channel wall flanges 217, two perpendicular channel floor segments 219, a secondary extrusion interlock 203, and a fastener flange 213 (with screws being the preferred fastener).

The secondary wall to wall extrusion 124 includes a self drilling screw tip alignment/starter groove 207 having tapered groove sidewalls 205 adjacent a floor connecting the sidewalls 205, and fastener cover recess cavities 211. Cavity 209 also functions to expel water that manages to seep through the cover and the fasteners.

The cross sections of the extrusions 123 and 124 remain substantially unchanged along their entire length. As a result, the cavity 201 extends along the length of the extrusion 123, with the cavity 201 being open at the ends of the extrusion, but substantially closed long its length, i.e. it doesn't have any paths for fluid to path between the cavity and the exterior of the extrusion 123 other than through the open ends of the extrusion. Similarly, the starter groove 207 extends along the length of the extrusion 124. Also, the channels 221 and 223 extend along the length of the extrusions 123 and 124 with extrusion 124 providing an outside wall of each of the channels 221 and 223, and the extrusion 123 providing the floors and inside walls of the channels 221 and 223. Further, the primary and secondary extrusions 123 and 124 cooperate to form a fastener and electrical harness routing cavity 209 that extends along the length of the extrusions 123 and 124. If used for electrical harness routing, the cavity 209 is accessible for service by removing secondary extrusion 124. The primary and secondary extrusions 123 and 124 also include grooves and nubs as shown extending along their lengths for adhesive flow and thickness.

Alternative Embodiments

Figure 53:
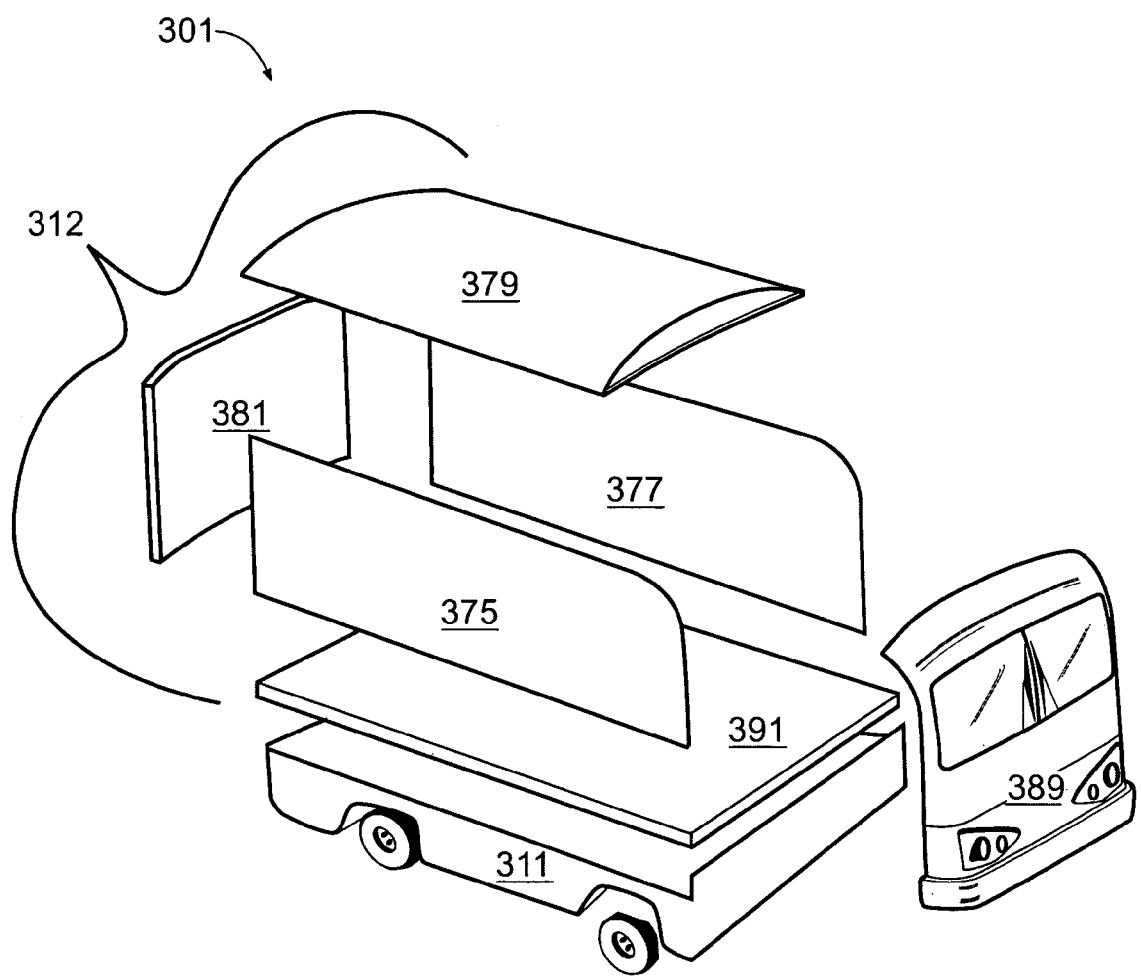
FIG. 53 is an exploded perspective view of a class A motorhome in accordance with an exemplary embodiment of the invention.
Figure 54:
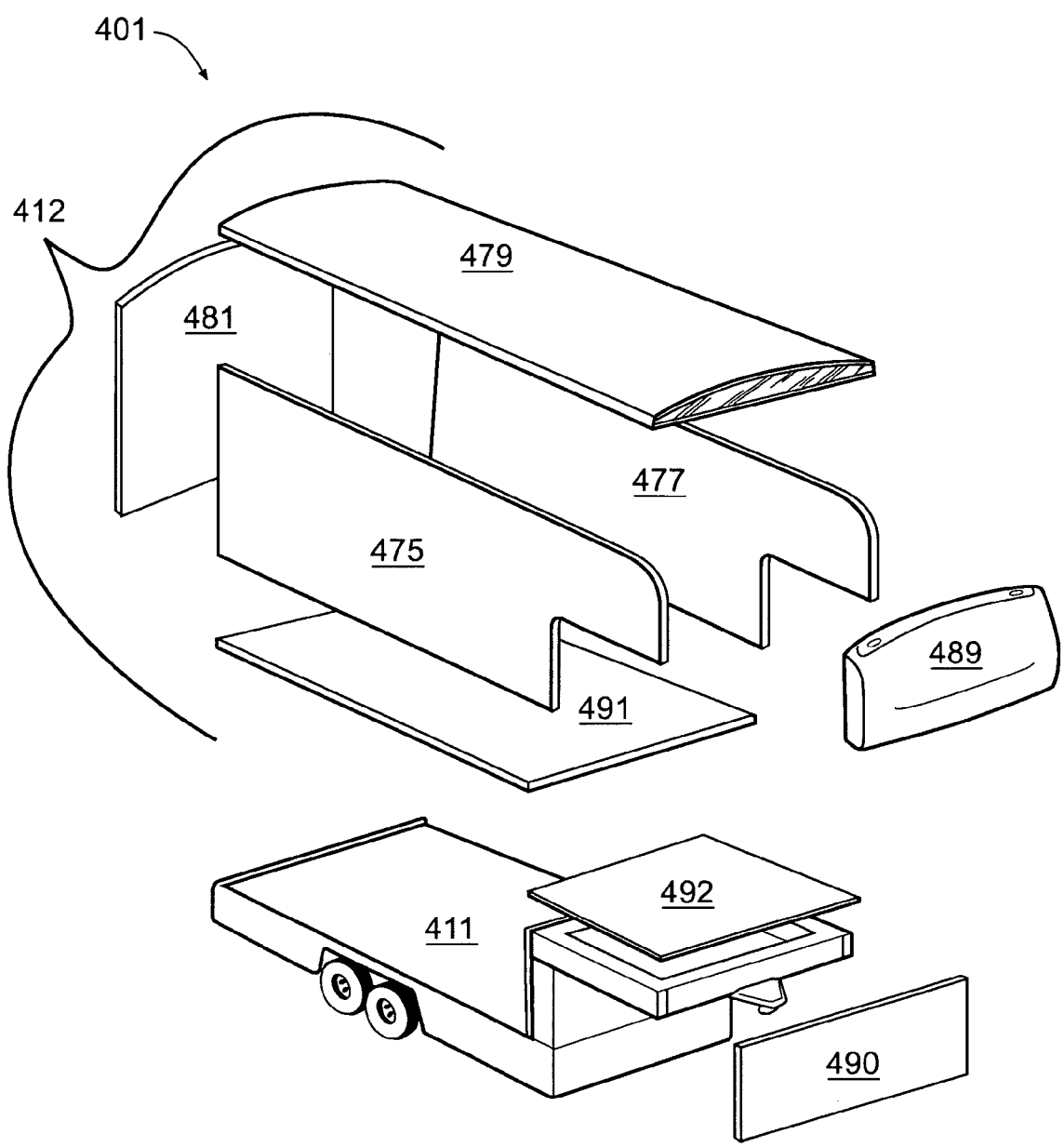
FIG. 54 is an exploded perspective view of a fifth wheel trailer in accordance with an exemplary embodiment of the invention.
Figure 55:
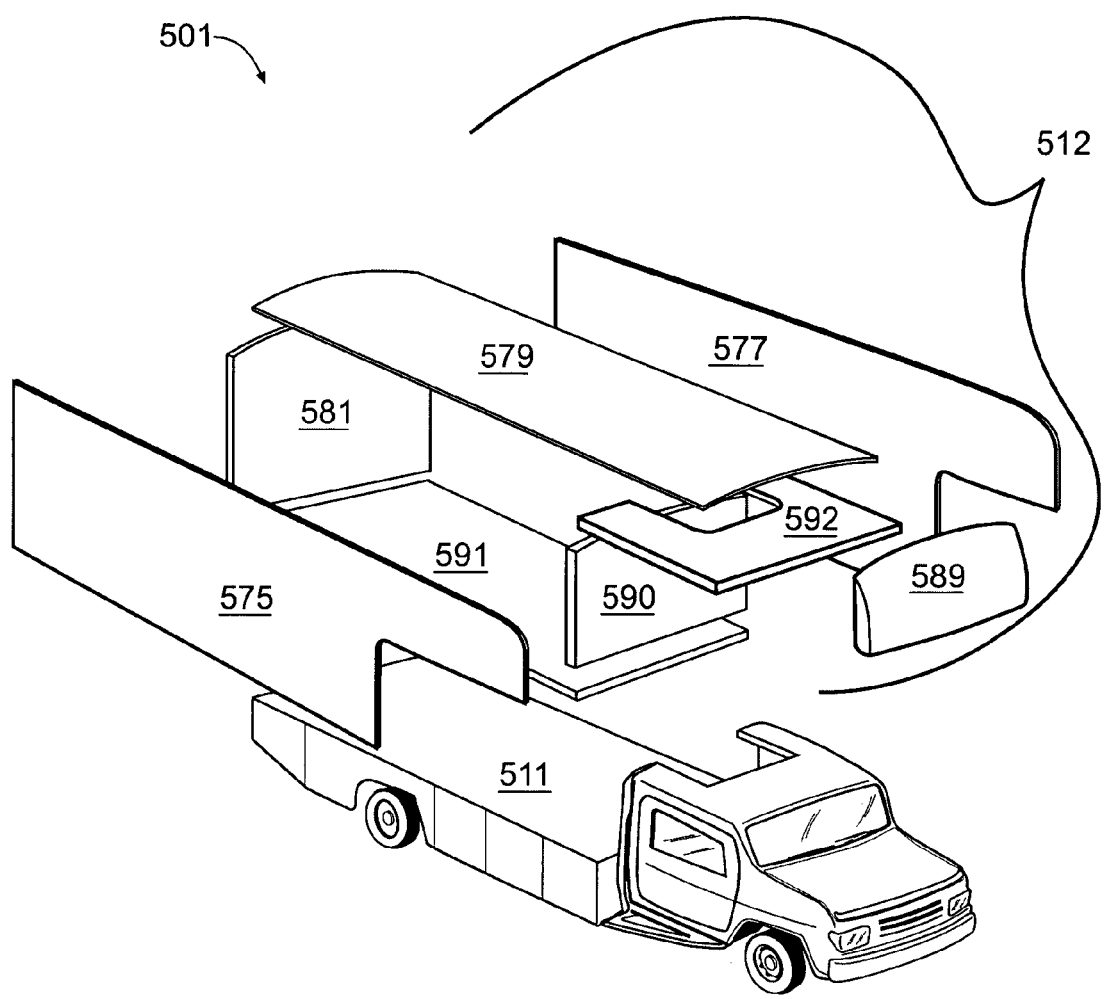
FIG. 55 is an exploded perspective view of a class C motorhome in accordance with an exemplary embodiment of the invention.

It is important to note that although the figures are directed to a travel trailer embodiment, the methods and apparatus described herein are applicable to other types of RVs such as motor-homes as well. FIGS. 53-55 provide examples of some such RVs.

In FIG. 53, a class A motorhome 301 includes a chassis 311 and a hull 312. As with the hull assembly of FIG. 35, the hull 312 comprises a curbside wall 375 and a roadside wall 377, a laminated ceiling 379, a rear panel 381, a front cap 389, and a laminated floor 391. The walls 375 and 377, rear panel 381, floor 391, and ceiling 379 are formed in a manner similar to the corresponding portions of the hull assembly of FIG. 35. Moreover, the walls 375 and 377, and rear panel 381 are bonded into two piece aluminum floor extrusions, the walls 375 and 377 are bonded into two piece aluminum extrusions at least partially included in the rear panel 381, and ceiling 379 includes two piece aluminum sidewall extrusions for coupling the ceiling 379 to the walls 375 and 377. The completed hull 312 is attached atop the chassis 311 with two piece mechanical fasteners and bonded in place using a structural urethane adhesive.

In FIG. 54, a fifth-wheel trailer 401 includes a chassis 411 and a hull 412. As with the hull assembly of FIG. 35, the hull 412 includes a curbside sidewall 475, a roadside sidewall 477, a laminated ceiling 479, a rear panel 481, a front cap 489, and a laminated floor 491. Additionally, because it is intended to extend over the rear portion of a tow vehicle, the hull 412 also includes a front lower panel 490, and a floor upper deck 492. As with the hulls 412 and 12, the sidewalls 475 and 477, laminated ceiling 479, rear panel 481, front cap 489, laminated floor 491, front lower panel 490, and floor upper deck 492 are coupled together using two piece aluminum extrusions included in the laminated ceiling 479, rear panel 481, front cap 489, laminated floor 491, front lower panel 490, and floor upper deck 492 for receiving and bonding to portions of the sidewalls 475 and 477.

The front lower panel 490 is intended to be frameless, and preferably comprises one or more EPS insulation panels sandwiched between a fiberglass outer layer and an interior vinyl covered panel/thin aluminum sheet. More preferably, a two-piece aluminum corner extrusions is bonded to each side of the panel 490. The corner extrusions interlock and bond to the lower vertical section of the roadside and curbside sidewalls 475 and 477.

The laminated upper deck 492, similar to the floor 491, preferably consists of an aluminum underbelly and an aluminum framework assembly. The aluminum framework assembly includes aluminum tubes and two floor to sidewall two piece aluminum extrusions. The two piece aluminum extrusions are used to receive and bond the upper horizontal length of each of the sidewalls 475 and 477.

The front cap 489 is preferably a laminated panel manufactured in a similar fashion to the rear panel 481 in that it is frameless, comprises EPS insulation panels sandwiched between an exterior fiberglass panel and a thin aluminum sheet/lauan vinyl covered panel, with a corner extrusion adhered to each side of the panel. The corner extrusions receive the upper vertical segments of the walls 475 and 477 which are bonded into the extrusions.

In FIG. 55, a camper 501 (class C motor home) includes a chassis 511 and a hull 512. The hull 512 includes a curbside sidewall 575, a roadside sidewall 577, a laminated ceiling 579, a rear panel 581, a front cap 589, a front lower panel 590, a laminated floor 591, and a floor upper deck 592. The construction and assembly of the hull 512 generally duplicates that of the hulls 412, 312 and 12 previously described. In particular, the sidewalls 575 and 577, laminated ceiling 579, rear panel 581, front cap 589, front lower panel 590, laminated floor 591, and floor upper deck 592 are coupled together using two piece aluminum extrusions included in the laminated ceiling 579, rear panel 581, front cap 589, front lower panel 590, laminated floor 591, and floor upper deck 592 for receiving and bonding to portions of the sidewalls 575 and 577. In a preferred method of assembly; (a) the laminated floor 591 forming a horizontal rectangular frame of two piece extrusions will serve as a starting point; (b) the front lower panel 590 will be inserted into and bonded to a front two piece floor extrusion of the floor 591; (c) the floor upper deck 592 will then be coupled to the panel 590; (e) the sidewalls 575 and 577 will be inserted into and bonded to side extrusions of the floor 591; (f) the rear panel 581 will be coupled to the floor 591 and sidewalls 575 and 577 using a rear extrusion of the floor 591 and the side extrusions of the panel 581; (g) the ceiling 579 is then coupled to the sidewalls 575 and 577 using the side extrusions of the ceiling 579, and the front cap 589 is coupled to the rest of the hull assembly 512.

Additional Features

Although the interior amenities will vary between embodiments, it is contemplated that some features may provide additional weight advantages. One such is the use of light weight plywood as the base material for the doors and drawers yielding a 30% weight reduction. A hardwood veneer was applied to the light weight plywood, finished and sealed.

Although house systems may be installed on the chassis 11 and/or the hull 12 using a variety of methods, it is contemplated that installing house systems in the following order may be advantageous in some instances: (1) electrical systems; (2) LPG plumbing; (3) fresh water, gray and black tank installation, and (4) termination plumbing. Although there is no limitation on the type of house systems included in the chassis 11, it is contemplated that various aspects of such system as included in the trailer 1 are advantageous.

Weight can further be reduced through the use of design engineered electrical harnesses. Such harnesses can be manufactured off-line, functionally tested, and quality control (QC) inspected and released prior to inventory and production installation in the chassis 11 and/or the hull 12. Except where it is not feasible, exclusive use of mate-n-lock connectors, such as those manufactured by AMP, Molex and Delphi-Packard are preferred. Use of such connectors will reduce labor and intrinsic problems associated with on-line crimping of wires to connectors typical of online assembly presently performed in the industry. Further, skilled labor requirements can be reduced or virtually eliminated, thereby, keeping manufacturing costs to a minimum.

It is also preferred that flexible ½ inch diameter corrugated stainless steel tubing (CSST) and brass fittings be installed as LPG gas plumbing. Benefits of such tubing include light weight, corrosion resistance, and ease of installation. Black pipe is presently used throughout the industry; however, it is heavy, not corrosion resistant and difficult to install and service.

For hot and cold plumbing, quick disconnect fittings and ⅝ inch diameter PVC piping is preferred. For drain plumbing, ABS piping is preferably used throughout. For climate control systems, furnace ductwork was routed above the laminated floor under the cabinetry within the toe kick area. Registers were located at the bottom of the cabinets distribute heat to the vehicle interior. If A/C is included, roof ducting can be designed into the performed EPS panel.

What is claimed is:
1. A recreational vehicle comprising:
a hull coupled to a mobile chassis, wherein the hull comprises a plurality of panels coupled together by a plurality of channel members;
at least one elongated channel member of the plurality of channel members comprises two elongated pieces;
a first pieces, of the two pieces, includes one side of a first channel extending along the length of the channel member in which a first panel of the plurality of panels of the hull is bonded, and a fastener flange extending along the length of the first piece;
a second piece of the two pieces includes an opposite side of the first channel including tapered groove substantially parallel to the fastener flange and extending along the length of the second piece, the tapered groove having a floor between tapering walls and having a surface contacting the fastener flange; and the vehicle further comprises a plurality of fasteners where each fastener of the plurality of fasteners extends through the floor of the second piece and the fastener flange of the first piece wherein the first and second pieces are removably coupled together.

2. The vehicle of claim 1 wherein the first piece of the at least one elongated channel member comprises a cavity extending along substantially the entire length of the first piece.

3. The vehicle of claim 2, wherein the cavity of the first piece is open at the ends of the first piece.

4. The vehicle of claim 1 wherein each fastener of the plurality of fasteners extends into a fastener receiving recess that is not part of the cavity of the first piece, and that is positioned between the first and second pieces of the at least one elongated channel member.

5. The vehicle of claim 4 wherein the first piece comprises an interlock cavity, and a portion of the second piece of the at least one elongated channel member extends into the interlock cavity.

6. The vehicle of claim 5 wherein the interlock cavity extends along the length of the first piece.

7. The vehicle of claim 1 wherein a portion of the first piece extends into a second panel of the plurality of panels and is bonded into the second panel between exterior surfaces of the second panel.

8. The vehicle of claim 7 wherein the portion of the first piece extending into the second panel comprises a C-channel that opens into the second panel.

9. The vehicle of claim 8 further comprising a plurality of nylon mold injected rafter connectors retained by the C-channel, each of the plurality of connectors extending into an end of one rib of a plurality of elongated aluminum tube ribs positioned within the second panel.

10. The vehicle of claim 9 wherein the first panel is a wall panel of the hull, and the second panel is a ceiling panel of the hull.

11. The vehicle of claim 7 wherein:

the first piece of the two pieces also includes one side of a second channel extending along the length of the channel member in which the second wall panel of the hull is bonded; and the second piece of the two pieces includes an opposite side of the second channel.

12. The vehicle of claim 1 wherein:

a wall panel of the plurality of panels is coupled to adjacent panels by at least two channel members of the plurality of channel members;

each of the at least two channel members comprises two pieces where a first piece of the two pieces includes one side of a first channel extending along the length of the channel member in which a first panel of the plurality of panels of the hull is bonded, a second piece of the two pieces includes an opposite side of the first channel, and the first and second pieces are removably coupled together; and the opposite sides of the second pieces of the at least two channel members are bonded to a common side of the wall panel that is part of the exterior of the hull.

13. The vehicle of claim 1 further comprising a chassis coupled to the hull, the chassis comprising:

interlocked first, second, and third segments, and fourth and fifth segments interlocked with the third segment; wherein an end of the first segment overlaps an end of the second segment and an end of the fourth segment overlaps an end of the fifth segment;

each of the overlapping ends of the first and second segments, and of the overlapping ends of the fourth and fifth segments, comprises a plurality of slots with the slots of the first segment aligned with the slots of the second segment and the slots of the fourth segment aligned with the slots of the fifth segment; and the third segment has a first end having tabs extending through the slots of the first and second segments, and a second end opposite the first end, the second end having tabs extending through the slots of the fourth and fifth segments, the third segment being substantially perpendicular to the first and second segments and the fourth and fifth segments.

\* \* \* \* \*